Figure 1:
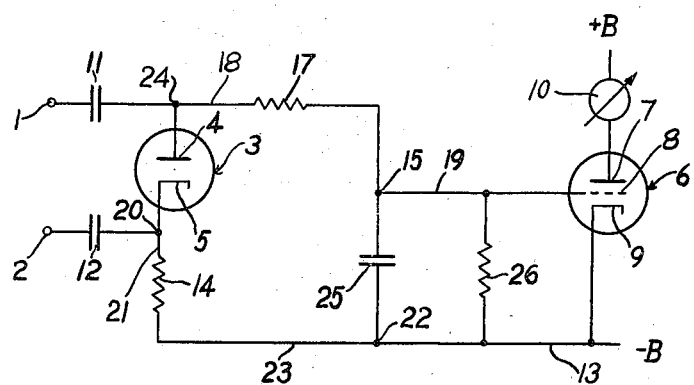

March 28, 1950　　　　J. C. FROMMER　　　　2,501,769
VACUUM TUBE VOLTMETER WITH BALANCED
INPUT SHUNT DIODE
Filed Sept. 15, 1947

INVENTOR.
JOSEPH C. FROMMER
BY

Patented Mar. 28, 1950

2,501,769

UNITED STATES PATENT OFFICE 2,501,769

VACUUM TUBE VOLTMETER WITH BALANCED INPUT SHUNT DIODE

Joseph C. Frommer, Cincinnati, Ohio, assignor to Clippard Instrument Laboratories, Inc., Cincinnati, Ohio, a corporation of Ohio Application September 15, 1947, Serial No. 773,996

13 Claims. (Cl. 171—95)

This invention relates to vacuum tube voltmeters and more particularly to the type of vacuum tube voltmeters known as rectifier-amplifier vacuum tube voltmeters.

It is an object of the invention to provide a rectifier-amplifier vacuum tube voltmeter which permits measuring accurately voltages between two points which may be both at A. C. potential relative to ground.

It is a further object of the invention to provide a rectifier-amplifier vacuum tube voltmeter which permits voltage measurements between two points both at A. C. potential relative to ground without causing undue loading of high frequency circuits and/or detuning where the voltage is to be measured across a tuned circuit.

A further object of the invention is to provide a rectifier-amplifier vacuum tube voltmeter adapted to serve the objects just mentioned without the need of insulating the casing of the instrument from ground, or from the zero line of the circuit.

Another object of the invention is to provide a rectifier-amplifier vacuum tube voltmeter wherein the alternating current impedance between both the plate and the cathode of the rectifier and ground or any point of the instrument having a low impedance to ground is kept at high enough a value to prevent undue loading or detuning of the circuit to be tested.

A further object of the invention is to provide a rectifier-amplifier vacuum tube voltmeter wherein between the two unknown terminals of the instrument and ground or any point of the instrument having low impedance to ground there are no other paths for alternating current than such of high impedance.

A further object of the invention is to provide a rectifier-amplifier vacuum tube voltmeter wherein the high impedance elements which block the connection between either of the rectifier electrodes and ground or a point of the instrument having low impedance to ground, are of galvanically conductive nature developing only a low out-of-phase impedance component.

Still a further object of the invention is to provide the just mentioned low out-of-phase component of the impedance by the use of elements having low stray capacitance and by the use of as short connections as feasible between the unknown terminals and the high impedance elements.

It is another object of the invention to provide in a rectifier-amplifier vacuum tube voltmeter of the kind referred to, means for balancing the voltage differences, as compared with the voltages of the coordinated unknown terminals, which may occur on the two rectifier electrodes if the potentials these terminals have with respect to ground are relatively high.

A further object of the invention is to provide a rectifier-amplifier vacuum tube voltmeter wherein the two rectifier electrodes are connected into two similar networks each connected at one end to one of the two unknown terminals and at the other end to the zero line of the instrument, these networks being so dimensioned that complete balance of these networks will exist for all frequencies.

Figure 2:
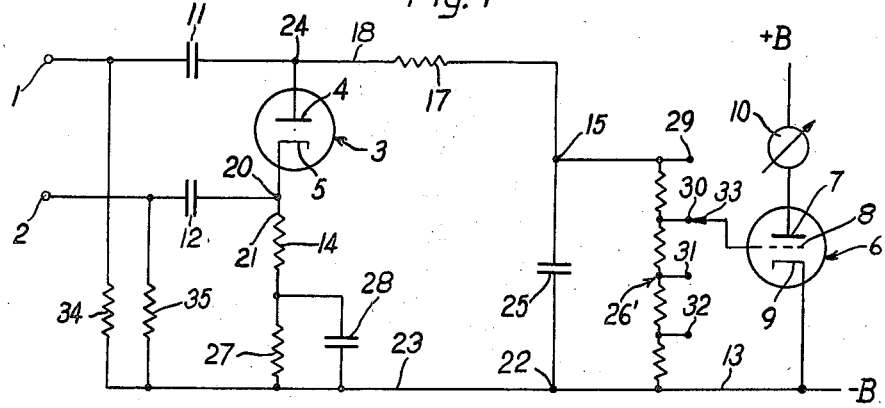
Figure 3:
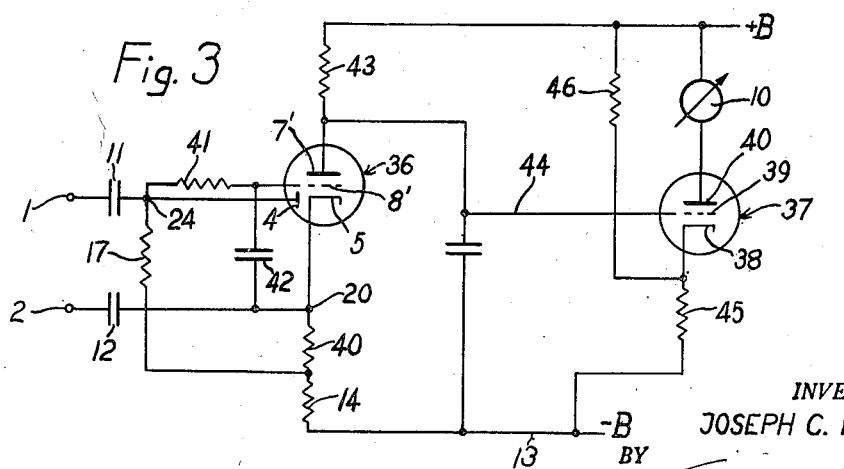

Other objects and advantages of the invention will appear as the description proceeds, reference being had to the accompanying drawing, in which:

Figs. 1, 2 and 3 are diagrams of three different circuits each embodying the invention.

Referring first to Fig. 1, the reference numerals 1 and 2 denote the two so-called "unknown" terminals of the vacuum tube voltmeter to which the alternating voltage to be measured is to be connected, 3 indicates generally a rectifier tube and 6 an amplifier tube, both tubes being shown in their simplest forms, that is, the tube 3 as a diode having a plate 4 and a cathode 5 and the amplifier tube 6 as a triode having a plate 7, a control grid 8 and a cathode 9. 10 denotes a meter, ordinarily a micro-ammeter, in series with the plate 7 of the amplifier tube and connected to the positive plate supply.

Each of the two electrodes 4 and 5 of the rectifier 3 is connected to its coordinated unknown terminal 1 or 2 through a condenser, the electrode 4 to the terminal 1 through condenser 11 and the electrode 5 to the terminal 2 by condenser 12. 13 is the zero line of the instrument by which term is understood that reference line for the voltages of the instrument which is usually connected to the negative terminal (—B) of the plate supply and which is ordinarily grounded either by direct connection or through a condenser or through the stray capacitance of the circuit elements connected to that zero line. The cathode terminal 20 of the rectifier 3 is connected to the zero line 13 by means of a resistor 14 of at least 100,000 ohms. The lead connecting this cathode terminal with the resistor 14 is denoted as 21 and the lead extending from the resistor 14 to a point 22 of the zero line is denoted as 23. The terminal 24 of the rectifier plate 4 is connected to the grid 8 of the amplifier 6 through a resistor 17 of at least 100,000 ohms, the lead connecting the plate terminal 24 with the resistor 17 being denoted as 18 and the lead extending between the resistor 17 and the grid 8 being indicated as 19.

The direct current obtained across the two resistors 14, 17 is filtered by a condenser 25 in parallel to a resistor 26, which condenser 25 is connected between point 22 of the zero line 13 and a point 15 of the lead 19. The voltage drop across the resistor 26 is a measure of the alternating voltage across the electrodes 4, 5 of the diode 3 which voltage in turn is closely equal to the alternating voltage across the unknown terminals 1, 2. As this voltage drop across the resistor 26 determines the plate current of the amplifier tube 6 the meter 10 which measures that plate current and which may, for direct reading, be calibrated in volts, indicates the voltage to be measured.

By means of the resistors 17, 26 and 14 a closed galvanic circuit is established between the two rectifier electrodes 4 and 5. As will be pointed out later, other high impedance elements may be used instead of the resistors 14 and 17 but such high impedance elements must always be of such nature as to be galvanically conductive. Choke coils, for instance, answer this requirement and may be used in appropriate cases.

It is an essential feature of the invention that no paths to ground or to any point which has low alternating current impedance to ground, such as the zero line 13 or the point 15, are permitted from the two rectifier electrodes 4, 5 except paths which have high alternating current impedance. This is in contrast to the common practice in connecting one of the two electrodes of the rectifier tube, usually the cathode, to the zero line by means of a path of low alternating current impedance, such as by direct connection or by a resistor shunted by a condenser. Due to this low impedance connection between the one unknown terminal and the zero line the conventional instruments do not permit accurate measurements of voltages between two points which are both at alternating potential to ground because, if used for such measurements, there would be a substantial flow of alternating current from the one unknown terminal mentioned to ground so as to cause loading of the circuits to be measured and detuning where tuned circuits are used.

Another reason why the conventional instrument having an alternating current path of low impedance between one of the unknown terminals and the zero line is not well adapted for measuring voltages between two points both at a relatively high potential relative to ground is the danger which would arise for the person using the instrument. Since the cabinet of the conventional instrument is ordinarily connected to the zero line and said path of low alternating current impedance is present between the one unknown terminal and the zero line, touching of the cabinet, when the two unknown terminals were connected to two points both at a relatively high potential towards ground, would amount to the person picking up directly the voltage difference against ground. To avoid this danger to the operator of a conventional instrument when taking measurements between two points both at A. C. potential towards ground, it would be necessary to insulate the cabinet of the instrument from the zero line which measure, however, would still not remove the causes for loading and de-tuning as mentioned above.

In the circuit shown in Fig. 1, all the paths between either of the rectifier electrodes 4, 5 and ground or between either of the two unknown terminals 1, 2 and ground are blocked by high impedances, in the example shown by the high-ohmic resistors 14, 17 before there is any direct connection or connection of low alternating current impedance to ground. For example, before current can reach the condenser 25, which condenser makes the point 15 a point of low alternating current impedance towards ground, it must pass the high impedance 17. No undue loading or de-tuning of the circuit to be tested is possible under this condition and since likewise neither of the two unknown terminals 1, 2 is connected to the zero line 23 otherwise than through an intervening high alternating current impedance 14 or 17, there is no need of insulating the cabinet of the instrument. The latter may unobjectionably be at the potential of the zero line, even though this potential may be widely different from the potentials of both unknown terminals 1 and 2.

As has been stated above, the alternating current impedances of the elements 14 and 17 have to be high enough not to cause undue loading on high freqeuncy circuits. These high impedances may be provided by the use of ohmic resistors of the order of 100,000 ohms or higher which are not shunted by any outside capacitor and have no higher stray capacitances than 5 mmf. Preferably, resistors are used whose stray capacitance is even appreciably lower than 5 mmf., such as 1 mmf. and less. The impedance of such a combination of an ohmic resistance of at least 100,000 ohms with stray capacitances in parallel thereto of, as a maximum, 20 mmf., will have different values at different frequencies at which the voltmeter is to operate. Using the well known formulas of alternating current theory for impedance, reactances etc., the proper values for the resistors 14 and 17 can be calculated for any frequency range. Thus, it will be found that for a voltmeter designed to work on audio-frequencies it is advantageous to use a resistor of 1 megohm or higher. For operation of the instrument at broadcast frequencies up to, say, 2 megacycles, the ohmic component should still be at least 1 megohm, where as for relatively short waves, such as from 5 to 500 megacycles, an ohmic component of 100,000 ohms will ordinarily suffice. In this connection it is to be noted that the influence of the parallel capacitances above mentioned, in particular the stray capacitance of the resistors 14 and 17, on the resulting impedance depends sharply on the frequency. If, e. g., the parallel capacitance is 10 mmf. (no inductance having to be considered) and the capacitive reactance of this capacitance is 15.9 megohms at 1 kilocycle, this reactance will drop to as little as 159 ohms at 100 megacycles.

In order to keep the stray capacitances low, resistors 14 and 17 of small diameters, such as less than 1/8", are preferable. As a further measure to keep the undesired parallel capacitances low all the leads situated between the terminals 1 and 2 and the resistors 17 and 14, respectively, are to be made as short as feasible. In particular, the lead between the terminal 1 and the condenser 11, then the lead between this condenser 11 and the plate terminal 24, as well as the lead 18 between said plate terminal 24 and the resistor 17 are to be kept as short as feasible. Likewise the lead between the terminals 2 and the condenser 12, the lead between the condenser 12 and the cathode terminal 20 and the lead 21 between this cathode terminal 20 and the resistor 14 ought to be kept at minimum length, such as less than 1''. Behind the two resistors 14 and 17 the necessary leads, such as the lead between the resistor 17 and point 15 or the lead between the resistor 14 and point 22, may be as long as convenient e. g., several feet long.

While the basic arrangement of Fig. 1 can be so dimensioned as to permit the measurement of A. C. voltages between two points both at potentials different from ground potential with satisfactory accuracy at all frequencies, Fig. 2 shows an arrangement of greater adaptability, permitting in particular such dimensioning as to give very accurate measuring results either at all frequencies or at a particular selected frequency. All the elements of the circuit arrangement of Fig. 1 are present also in Fig. 2 and like reference numerals for these elements are used in Figs. 1 and 2. Whereas, however, in Fig. 1 the resistor 14 is connected directly to the lead 23 and thereby to the zero line 13, in Fig. 2 this resistor 14 is connected to the zero line by means of another resistor 27 shunted by a condenser 28. Instead of the fixed resistor 26 of Fig. 1 whose one end point is connected to the grid 8 of the amplifier tube 9 a resistor 26' is used in Fig. 2 having besides the end point 29 a number of tap points 30, 31 and 32, so that the grid 8 of the amplifier tube 6 may be connected to any one of these points 29—31 by means of a movable contact arm 33. As in Fig. 1 there is also in Fig. 2 a closed galvanic circuit established between the two rectifier electrodes 4 and 5, this circuit containing the resistors 17, 26', 27 and 21. Again the voltage drop across the resistor 26' is a measure of the alternating voltage across the unknown terminals 1 and 2 and this voltage drop is brought either in full or in part to the grid 8 of the amplifier tube depending on which of the points 29, 30, 31 or 32 of the resistor 26' is being connected to the grid 8 by means of the movable contact arm 33.

As will be seen from Fig. 2 the two networks to which the two electrodes 4, 5 of the rectifier tube 3 are connected are of similar nature. In these two networks the condenser 11 corresponds to the condenser 12, the resistor 17 to the resistor 14, the resistor 26' to the resistor 27 and the condenser 25 to the condenser 28. Each of these networks represents a voltage divider between the zero line and one of the terminals of the unknown, one arm of which is the condenser 11 or 12 connecting the particular electrode 4 or 5 with the coordinated unknown terminal 1 or 2 and whose other arm is formed by the resistor 17 or 14 and the parallel arrangement of resistor and condenser 25, 26 or 27, 28 connected therewith. If the capacitances of the condensers 11, 12, 25 and 28 are denoted respectively as $C_{11}$, $C_{12}$, $C_{25}$ and $C_{28}$, the resistance values of the resistors 14, 17, 26' and 27 respectively as $R_{14}$, $R_{17}$, $R_{26}$, and $R_{27}$, if further $w$ denotes the angular velocity of the A. C. voltage and $j$ is the imaginary unit, then the impedances of the arms of the two voltage dividers acting on the two electrodes 4, 5 are:

$$\frac{1}{jwC_{11}}$$

for the arm comprising condenser 11;

$$R_{17}+\frac{1}{1/R_{26'}+jwC_{25}}$$

for the arm comprising the resistors 17 and 26' and the condenser 25;

$$\frac{1}{jwC_{12}}$$

for the arm containing the condenser 12; and $$R_{14}+\frac{1}{1/R_{27}+jwC_{28}}$$

for the arm comprising the resistors 21 and 27 and the condenser 28.

As will be explained, with such two similar networks as shown in Fig. 2 the readings on the meter 10 will be accurate regardless of the frequency at which a measurement is taken, provided the various elements of the two networks are dimensioned so that the ratio of the impedances of the two arms of the voltage divider acting on the rectifier plate 4 is the same as the ratio of the impedances of the two arms of the voltage divider acting on the rectifier cathode 5. Mathematically speaking, this means that the following relationship has to exist:

$$\left(R_{14}+\frac{1}{1/R_{27}+jwC_{28}}\right):\left(R_{17}+\frac{1}{1/R_{26'}+jwC_{25}}\right)=\frac{1}{jwC_{12}}:\frac{1}{jwC_{11}}$$

For it will be understood that, since the two rectifier electrodes are connected with the tap points 24 and 20 of the two voltage dividers mentioned, there will appear on these electrodes voltages which are different from the voltages on the coordinated unknown terminals 1 and 2. This difference in voltage depends on the voltage between the unknown terminals and ground and on the ratio of the impedances of the two arms of each voltage divider. If, for instance, this ratio is 1:100 for both voltage dividers and both unknown terminals 1, 2 have the same potential of, say, 100 volts with respect to ground, and of zero volts with respect to each other, then there will appear on the plate 4 as well as on the cathode 5 a voltage which differs from the voltage of the coordinated unknown terminal by approximately one volt. Since, however, this difference is the same for both electrodes 4 and 5 and what operates the meter 10 is only the voltage difference between the two rectifier electrodes, said meter will give the reading zero which corresponds exactly with the voltage difference of zero existing in the example given between the two unknown terminals 1 and 2.

If the above mentioned impedance relationship is not provided for, then the voltages appearing on the two rectifier terminals 4 and 5 will differ from the voltages of their respectively coordinated unknown terminals 1 and 2 amounts which are different for the two electrodes in amplitude and/or in phase. Such unbalance will lead to readings on the meter 10 which may contain an intolerable error. This error may amount only to fractions of one volt but if the actual voltages to be measured by the voltmeter are themselves in the order of fractions of one volt, it is obvious that such error would lead to completely unreliable readings on the meter. As has been mentioned before, readings completely free from such error will be obtained by dimensioning the two similar networks exactly according to the above given formula for the impedance ratios. In view of the fact, however, that not all of the elements in that formula are of equal influence on the result to be obtained, certain approximations may be made which will still lead to satisfactory results in many practical cases. Thus, instead of providing for a complete balance of the two networks for all frequencies it may be satisfactory to provide complete balance for one particular frequency, preferably the line frequency, and approximate balance for all other frequencies above that selected frequency. Furthermore, for many practical uses it will be sufficient to have an approximate balance for all frequencies without exact balance for any particular frequency. Where exact balance is desired only for one selected frequency, such as the line frequency, the above given formula can be applied to that particular frequency choosing the condenser 25 large, the condenser 28 small, and regarding said condenser 25 as a short circuit and said condenser 28 as absent for all other frequencies. Where no exact balance for any particular frequency but approximate balance for all frequencies is desired, this can be achieved by making the elements 27 and 28 zero, giving the condenser 25 a high value (of at least .005 mf.) and by choosing the ratio between the resistors 17 and 14 so as to be reciprocal to the ratio of the condensers 11 and 12. This third way amounts practically to the application of the formula for the impedance ratios given above to the simplified circuit of Fig. 1. The following table gives one numerical example for each of the three mentioned ways of dimensioning:

long as the condensers 11 and 12 are being loaded. This voltage drop, which would cause a temporary erroneous indication on the meter 10, vanishes when the condensers 11 and 12 have reached the end of their loading period. The time until this stationary state is reached depends on the size of the condensers 11, 12. Previously, the error has been mentioned which is likely to arise when the alternating voltage between the points 1 or 2 and ground is high in comparison to the alternating voltage to be measured, and in order to diminish that error it would be desirable to make the condensers 11 and 12 large. Large condensers, however, would not only make for an unduly high time constant but also for high stray capacitance which is contrary to the purposes of the present invention. In view of these controversial conditions a suitable remedy consists in using as small capacitors 11 and 12 as will cause no objectionable decrease of sensitivity of the instrument at the lowest frequencies at which measurements are to be taken and providing at the same time, in order to further reduce the time constant, at least one of the two resistors 34 and 35 shown in Fig. 2. The resistor 34 connects the terminal 1 and the resistor 35 the terminal 2 with the zero line. Using at least one of these resistors 34 and 35 permits the use of condensers 11 and 12 of such small size that their stray capacitance is sufficiently small for the purposes of the invention and the time constant of the network will be only a few percent of what it would be without such resistors 34, 35. Resistors in the order of 20 megohms have given good results.

If both resistors 34 and 35 are used this will at the same time provide a means for bridging over an unduly high internal resistance for D. C. which may exist in some cases between the two terminals of the unknown voltage source. Alternatively a resistor (not shown) could be arranged between the points 1 and 2 for the same purpose.

|  | $C_{11}$ | $C_{12}$ | $C_{25}$ | $C_{28}$ | $R_{17}$ | $R_{14}$ | $R_{26'}$ | $R_{27}$ |
|---|---|---|---|---|---|---|---|---|
| Complete balance for all frequencies | .005 | .015 | .005 | .015 | 10.0 | 3.33 | 20.0 | 6.67 |
| Exact balance for 60 cycles, reasonable approximation for higher frequencies | .005 | .010 | .002 | .00036 | 10 | 3.3 | 10 | 2.2 |
| Approximate balance for all frequencies | .010 | .010 | .010 | 0 | 10 | 10 | 20 | 0 |

Since the instrument is to be useable for measuring the alternating voltage between two points of which both are separated from the zero line by high alternating current impedances, the electrostatic potential between the source of the voltage to be measured and the zero line of the instrument may be considerable. When the unknown terminals 1, 2 are first applied to the unknown voltage there will take place a voltage division of the electrostatic potential between the resistance of the uncontrolled path between the zero line and the source of the voltage to be measured on one side and the networks extending between each of the terminals 1 and 2 and the zero line, one network containing, as above described, the elements 11, 17, 26' and 25 and the other network the elements 12, 14, 27 and 28. If the leakage resistance between the voltage source to be measured and the zero line is, for instance, 100 times greater than the resistance of said networks, then a voltage will appear on both cathode and plate of the rectifier tube which, while being 100 times smaller than the electrostatic potential between the voltage source to be measured and the zero line, still is great enough to cause a substantial voltage drop across 26' as In Fig. 3 a modified embodiment of the invention is shown wherein a diode rectifier system and a triode amplifying system is arranged within a common envelope 36. As in Figs. 1 and 2, the reference numerals 4 and 5 denote the plate and the cathode of a rectifier system. The cathode 5 serves also as the cathode for the amplifying system, whose plate and grid are indicated at 7' and 8', respectively. 37 is a second amplifier tube having a cathode 38, a grid 39 and a plate 40, the indicating instrument 10 being arranged in the plate circuit of the tube 37. This meter may be a D. C. milli- or microammeter. Between the zero line 13 of the instrument and the cathode 5 of the diode-triode tube 36 there is arranged an element 14 of high alternating current impedance, shown in the drawing as a resistor. The plate 4 of the diode has a connection to the zero line 13 only via the high impedance 17 which is also shown in the drawing in the form of a resistor. As in Figs. 1 and 2, there is a condenser 11 arranged between the unknown terminal 1 and the terminal 24 of the diode plate 4 and a condenser 12 between the unknown terminal 2 and the terminal 20 of the diode cathode 5. In series with the high impedance 14 there is a resistor 40 to provide the necessary bias for the grid 8' of the first amplifier system 5, 7', 8'. The rectified voltage obtained across the resistor 17 is filtered by a resistor 41 and a condenser 42 before being brought to the grid 8' of the tube 36. The D. C. voltage drop obtained across a resistor 43 is brought over a lead 44 to the grid 39 of the second amplifier tube 37 whose cathode 38 is held at a conveniently positive potential by a voltage divider 45, 46.

From an inspection of Fig. 3 is will be seen that again all the paths between either of the rectifier electrodes 4, 5 and the zero line or between either of the two unknown terminals 1, 2 and the zero line are blocked by high impedances.

Similar considerations as have been pointed out in connection with Fig. 1 in regard to keeping as small as possible the stray capacitances of the high impedance elements as well as of the leads extending between these high impedance elements and the unknown terminals 1, 2 or connecting any points therebetween apply evidently also to Figs. 2 and 3.

While in Figs. 1, 2 and 3 the high impedances separating the two rectifier electrodes from the zero line or from any points of the instrument having low impedances towards ground are shown as resistors, such high impedances can also take the form of choke coils of proper design. The use of choke coils instead of the resistors 14, 17 may in some cases be preferable, such as when a directly heated diode is to be used. Also the fact that with the use of choke coils instead of the resistors 14, 17 practically all the D. C. voltage will fall, e. g. with the circuit of Fig. 1, upon the resistor 26, makes for an increase of the efficiency of the instrument. Such choke coils will have to have a susceptance which is small as compared with the susceptance of the circuits to be measured. Again the stray capacitances of these coils ought to be kept at a minimum. Advantage may be taken in this connection of the well known series arrangement of several choke coils of different inductances. This known measure is ordinarily used when it is desired to make the same instrument useable for a wide range of frequencies. If a coil of high inductance is connected in series with a coil of small inductance, the former will offer a high impedance to low frequencies and the latter a high impedance to high frequencies, and the total parallel capacitance will be relatively low. To give a numerical example: a suitable choke coil arrangement to be used instead of each of the resistors 14 and 17 when the instrument is intended to be used exclusively for high frequency work would be a 10 millihenry choke in series with a 100 microhenry choke. If the instrument is to be used also for low frequencies then an iron core coil of the order of 1000 henries in series with the two coils just mentioned would be suitable.

As has been pointed out before in connection with the resistors 14, 17, the balance of the networks containing the high impedance elements may be made either complete or only approximate for all frequencies or one selected frequency, such as the line frequency.

While I have shown in the drawing three particular embodiments of the invention and have mentioned a few numerical examples for dimensioning certain elements particularly of the circuit shown in Fig. 2, I desire it to be understood that these embodiments and numerical figures have been given by way of example only and are to be interpreted as illustrative and not as a limitation.

What I claim is:

1. In a shunt type rectifier-amplifier vacuum tube volt-meter for measuring alternating voltages, a pair of terminals for application to the voltage to be measured, a rectifier tube comprising a cathode and a plate connected to an amplifier tube having a cathode, a plate and at least a control grid in such manner as to render the D. C. plate current of said amplifier tube dependent on the A. C. voltage applied to said two rectifier tube electrodes, at least one point having low impedance to ground each of said two rectifier tube electrodes being connected to one of said terminals and to at least one of said points having low impedance to ground, each of said connections between one of said rectifier tube electrodes and one of said terminals including a condenser, and said connections between either of said rectifier tube electrodes and any of said points having low impedance to ground being by means of galvanically conductive elements having high alternating current impedance.

2. In a shunt type rectifier-amplifier vacuum tube voltmeter for measuring alternating voltages as claimed in claim 1, wherein the connection between either of the rectifier tube electrodes and any of said points having low impedance to ground by means of galvanically conductive elements has a high alternating current impedance equivalent to that obtainable from an ohmic resistance of one megohm as a minimum with a capacitance in parallel thereto of 10 mmf. as a maximum.

3. In a shunt type rectifier-amplifier vacuum tube voltmeter for measuring alternating voltages, a pair of terminals for application to the voltage to be measured, a rectifier tube having a cathode and a plate connected to an amplifier tube having a cathode, a plate and at least a control grid in such manner as to render the D. C. plate current of said amplifier tube dependent on the A. C. voltage applied to said two rectifier tube electrodes, at least one point having low impedance to ground each of said two rectifier electrodes being connected to one of said terminals by means of a condenser and to at least one of said points having low impedance to ground by means of a resistor of at least 1 megohm having a stray capacitance of less than 20 mmf.

4. A shunt type rectifier-amplifier vacuum tube voltmeter for measuring alternating voltages as claimed in claim 3, wherein the stray capacitances of each of said resistors and of all the leads extending between the terminal to which that resistor is coordinated and the coordinated electrode, as well as between that electrode and said resistor, amount to a total of not more than 10 mmf.

5. In a shunt type rectifier-amplifier vacuum tube voltmeter for measuring alternating voltages, a pair of terminals for application to the voltage to be measured, a rectifier tube having a cathode and a plate connected to an amplifier tube having a cathode, a plate and at least a control grid in such manner as to render the D. C. plate current of said amplifier tube dependent on the A. C. voltage applied to said two rectifier tube electrodes, two voltage dividers, the elements of the one of said two voltage dividers being independent of the elements of the other of said two voltage dividers, each of said two rectifier electrodes being connected to the midpoint of one of said voltage dividers, one arm of each of said voltage dividers extending between one of said terminals and one of said electrodes and containing at least one condenser and the other arm of each of said voltage dividers extending between the electrode and ground and comprising galvanically conductive elements having a high alternating current impedance, the ratio of the impedances of the two arms of said voltage divider having its midpoint connected to one of said electrodes being the same as the ratio of the impedances of the two arms of said voltage divider having its midpoint connected to the other of said two electrodes.

6. In a shunt type rectifier-amplifier vacuum tube voltmeter for measuring alternating voltages, a pair of terminals for application to the voltage to be measured, a rectifier tube having a cathode and a plate connected to an amplifier tube having a cathode, a plate and at least a control grid, in such a manner as to render the D. C. plate current of said amplifier tube dependent on the A. C. voltage applied to said two rectifier tube electrodes, two voltage dividers having each a midpoint connected to one of said two rectifier electrodes, the elements of the one of said two voltage dividers being independent of the elements of the other of said two voltage dividers, one arm of each of said voltage dividers extending between one of said terminals and one of said electrodes and comprising a condenser, and the other arm of each of said voltage dividers extending between the coordinated electrode and ground and comprising a resistor of at least 100,000 ohms having a stray capacitance of less than 20 mmf., the ratio between the impedances of said condensers in said two voltage dividers being reciprocal to the ratio between the impedances of said resistors in said two voltage dividers.

7. In a shunt type rectifier-amplifier vacuum tube voltmeter for measuring alternating voltages, a pair of terminals for application to the voltage to be measured, a rectifier tube having a cathode and a plate connected to an amplifier tube having a cathode, a plate and at least a control grid in such a manner as to render the D. C. plate current of said amplifier tube dependent on the A. C. voltage applied to said two rectifier tube electrodes, two voltage dividers having each a midpoint connected to one of said two rectifier electrodes and the elements of the one of said two voltage dividers being independent of the elements of the other of said two voltage dividers, said two voltage dividers forming two similar networks, one arm of each of said voltage dividers extending between one of said terminals and one of said electrodes and comprising at least one condenser and the other arm of each of said voltage dividers extending between the coordinated electrode and ground and comprising galvanically conductive elements having a high impedance equivalent at least to that obtainable from an ohmic resistance of 1 megohm as a minimum with a capacitance parallel thereto of 10 mmf. as a maximum, the ratio of the impedances of the two arms of said voltage divider having its midpoint connected to one of said electrodes being the same as the ratio of the impedances of the two arms of the similar voltage divider having its midpoint connected to the other of said two electrodes.

8. In a shunt type rectifier-amplifier vacuum tube voltmeter for measuring alternating voltages, a pair of terminals for application to the voltage to be measured, a rectifier tube having a cathode and a plate connected to an amplifier tube, having a cathode, a plate and at least a control grid, in such a manner as to render the D. C. plate current of said amplifier tube dependent on the A. C. voltage applied to said two rectifier tube electrodes, two voltage dividers having each a midpoint connected to one of said two rectifier electrodes, one arm of each of said voltage dividers extending between one of said terminals and one of said electrodes and comprising a condenser, and the other arm of each of said voltage dividers extending between the coordinated electrode and ground and comprising a resistor of at least 1 megohm having a stray capacitance of less than 20 mmf., one of these other arms having in series with said resistor of at least 1 megohm a parallel combination of a resistor with a small condenser, the ratio between the impedances of said resistor in the one voltage divider and the impedance of said resistor in series with said parallel combination of a resistor with a small condenser in the other voltage divider being reciprocal to the ratio between the impedances of said condensers in the corresponding first named arms of said two voltage dividers.

9. In a shunt type rectifier-amplifier vacuum tube voltmeter for measuring alternating voltages, a pair of terminals for application to the voltage to be measured, a rectifier tube having a cathode and a plate connected to an amplifier tube having a cathode, a plate and at least a control grid in such a manner as to render the D. C. plate current of said amplifier tube dependent on the A. C. voltage applied to said two rectifier tube electrodes, two voltage dividers having each a midpoint connected to one of said two rectifier electrodes and the elements of the one of said two voltage dividers being independent of the elements of the other of said two voltage dividers, said two voltage dividers forming two networks, each of said networks comprising to one side of its midpoint an arm including a condenser and to the other side thereof an arm including a galvanically conductive element having a high impedance equivalent at least to that obtainable from an ohmic resistance of 1 megohm as a minimum with a capacitance parallel thereto of 10 mmf. as a maximum in series with a parallel combination of a resistor with a condenser, the ratio of the impedances of the two arms of said voltage divider having its midpoint connected to the one of said electrodes being the same as the ratio of the impedances of the two arms of the similar voltage divider having its midpoint connected to the other of said two electrodes.

10. In a shunt type rectifier-amplifier vacuum tube voltmeter for measuring alternating voltages, a pair of terminals for application to the voltage to be measured, a rectifier tube comprising a cathode and a plate connected to an amplifier tube having a cathode, a plate and at least a control grid in such manner as to render the D. C. plate current of said amplifier tube dependent on the A. C. voltage applied to said two rectifier tube electrodes, at least one point having low impedance to ground, each of said two rectifier tube electrodes being connected to one of said terminals and to at least one of said points having low impedance to ground, each of said connections between one of said rectifier tube electrodes and one of said terminals including a condenser, said connections between either of said rectifier tube electrodes and any of said points having low impedance to ground being by means of galvanically conductive elements having high alternating current impedance, and a resistor in the order of several megohms between ground and one of said terminals.

11. In a shunt type rectifier-amplifier vacuum tube voltmeter for measuring alternating voltages, a pair of terminals for application to the voltage to be measured, a rectifier tube comprising a cathode and a plate connected to an amplifier tube having a cathode, a plate and at least a control grid in such manner as to render the D. C. plate current of said amplifier tube dependent on the A. C. voltage applied to said two rectifier tube electrodes, at least one point having low impedance to ground, each of said two rectifier tube electrodes being connected to one of said terminals and to at least one of said points having low impedance to ground, each of said connections between one of said rectifier tube electrodes and one of said terminals including a condenser, said connections between either of said rectifier tube electrodes and any of said points having low impedance to ground being by means of galvanically conductive elements having high alternating current impedance, and a resistor in the order of several megohms between ground and each of said terminals.

12. In a shunt type rectifier-amplifier vacuum tube voltmeter for measuring alternating voltages, a pair of terminals for application to the voltage to be measured, a rectifier tube having a cathode and a plate connected to an amplifier tube having a cathode, a plate and at least a control grid in such a manner as to render the D. C. plate current of said amplifier tube dependent on the A. C. voltage supplied to said two rectifier tube electrodes, two voltage dividers having each a midpoint connected to one of said two rectifier electrodes and the elements of the one of said two voltage dividers being independent of the elements of the other of said two voltage dividers, said two voltage dividers forming two similar networks, each of said networks comprising to one side of its midpoint an arm including a condenser and to the other side thereof an arm including a resistor of at least 1 megohm and of a stray capacitance of less than 1 mmf. in series with a parallel combination of a resistor with a condenser, the ratio of the impedances of the two arms of said voltage divider having its midpoint connected to the one of said electrodes being the same as the ratio of the impedances of the two arms of the similar voltage divider having its midpoint connected to the other of said two electrodes, and a resistor in the order of several megohms between ground and one of said terminals.

13. In a shunt type rectifier-amplifier vacuum tube voltmeter for measuring alternating voltages, a pair of terminals for application to the voltage to be measured, a rectifier tube having a cathode and a plate connected to an amplifier tube having a cathode, a plate and at least a control grid in such a manner as to render the D. C. plate current of said amplifier tube dependent on the A. C. voltage applied to said two rectifier tube electrodes, two voltage dividers having each a midpoint connected to one of said two rectifier electrodes and the elements of the one of said two voltage dividers being independent of the elements of the other of said two voltage dividers, said two voltage dividers forming two similar networks, each of said networks comprising to one side of its midpoint an arm including a condenser and to the other side thereof an arm including a resistor of at least 1 megohm and of a stray capacitance of less than 1 mmf. in series with a parallel combination of a resistor with a condenser, the ratio of the impedances of the two arms of said voltage divider having its midpoint connected to the one of said electrodes being the same as the ratio of the impedances of the two arms of the similar voltage divider having its midpoint connected to the other of said two electrodes, and a resistor in the order of several megohms between ground and each of said terminals.

JOSEPH C. FROMMER.

REFERENCES CITED

The following references are of record in the file of this patent:

UNITED STATES PATENTS

| Number | Name | Date |
|---|---|---|
| Re. 22,258 | Mittelmann | Jan. 26, 1943 |
| 2,316,044 | Blair | Apr. 6, 1943 |
| 2,324,215 | Kinsburg | July 13, 1943 |
| 2,440,283 | Levy | Apr. 27, 1948 |

FOREIGN PATENTS

| Number | Country | Date |
|---|---|---|
| 299,277 | Italy | July 27, 1932 |
| 477,392 | Great Britain | Dec. 22, 1937 |